United States Patent
Tyler et al.

(10) Patent No.: US 6,989,109 B2
(45) Date of Patent: Jan. 24, 2006

(54) COMPOSITION FOR CONDITIONING WATER USED IN AQUARIUMS

(75) Inventors: Michael Tyler, Piscataway, NJ (US); Roberto Falcone, Little Falls, NJ (US); Joshua Reilly, Jackson, NJ (US)

(73) Assignee: The Hartz Mountain Corporation, Secaucus, NJ (US)

( * ) Notice: Subject to any disclaimer, the term of this patent is extended or adjusted under 35 U.S.C. 154(b) by 84 days.

(21) Appl. No.: 10/735,068

(22) Filed: Dec. 11, 2003

(65) Prior Publication Data

US 2005/0127323 A1 Jun. 16, 2005

(51) Int. Cl.
*C02F 5/08* (2006.01)
*A01K 61/00* (2006.01)
*A01K 63/04* (2006.01)

(52) U.S. Cl. ............... 252/176; 119/231; 119/268
(58) Field of Classification Search ............... 252/176
See application file for complete search history.

(56) References Cited

U.S. PATENT DOCUMENTS

| | | | | |
|---|---|---|---|---|
| 4,284,599 A | * | 8/1981 | Andersen et al. | 422/18 |
| 4,421,533 A | * | 12/1983 | Nishino et al. | 95/138 |
| 4,451,440 A | * | 5/1984 | Thompson, III | 423/112 |
| 5,078,889 A | * | 1/1992 | Higgins et al. | 210/683 |
| 5,310,633 A | * | 5/1994 | Yoshida et al. | 430/458 |
| 6,294,615 B1 | | 9/2001 | Higashino et al. | |
| 6,488,091 B1 | * | 12/2002 | Weaver et al. | 166/300 |
| 2002/0117445 A1 | * | 8/2002 | Whiteman | 210/620 |

* cited by examiner

*Primary Examiner*—Randy Gulakowski
*Assistant Examiner*—Timothy J. Kugel
(74) *Attorney, Agent, or Firm*—Jeffrey M. Kaden; Gottlieb, Rackman & Reisman, P.C.

(57) ABSTRACT

A composition for conditioning water in an aquarium in order to both control water pH and reduce and/or eliminate chlorine, chloramine and ammonia build-up is provided. The composition includes monopotassium phosphate in an amount between about 10 and 50 weight percent and sodium hydrosulfite in an amount between 1 and 20 weight percent, with the balance being deionized water.

21 Claims, No Drawings

COMPOSITION FOR CONDITIONING WATER USED IN AQUARIUMS

BACKGROUND OF THE INVENTION

This invention relates to a composition for conditioning water used in aquariums, and more particularly to a combination of chemical designed to control pH as well as to reduce and/or eliminate chlorine, chloramines and ammonia in aquarium water.

Many homes as well as businesses have aquariums for fish and other aquatic life. Not only do fish aquariums enable one to maintain various forms of aquatic life as a pet, they can provide an aesthetic value as well, enhancing the look or appeal of a room.

In order to maintain a fish aquarium, it is important to control the pH of the water in order to provide a safe and healthful environment for the fish maintained in the aquarium. If the pH becomes acidic, many fish cannot adapt to such a condition and will inevitably die.

It is also important to reduce and/or eliminate chlorine, chloramines and ammonia in water that is used for aquariums. The build-up of these chemicals will also severely impact the health of the fish since these chemicals are toxic to fish and other aquatic organisms at relatively low levels.

Accordingly, it would be desirable to provide a composition that could be regularly added to a fish aquarium in order to both control pH of the water and reduce and/or eliminate chlorine, chloramine and ammonia build-up.

SUMMARY OF THE INVENTION

Generally speaking, in accordance with the invention, a composition for conditioning water in an aquarium in order to both control water pH and reduce and/or eliminate chlorine, chloramine and ammonia build-up is provided. The composition includes monopotassium phosphate or another alkali metal phosphate in an amount between about 10 and 50 weight percent and sodium hydrosulfite or another alkali metal sulfite in an amount between 1 and 20 weight percent, with the balance being deionized water.

The phosphate ingredient controls and adjusts the pH of the aquarium water while the sulfite chemically reacts with chlorine, chloramines and ammonia that have built up in the aquarium, converting them into less harmful substances.

In addition, sodium hydroxide or other alkali metal hydroxides may be added to the composition in an amount between about 1 and 20 weight percent. The addition of sodium hydroxide will facilitate the control and adjustment of water pH since it provides hydroxide ions to the buffer solution formed by the monopotassium phophate and also provides sodium ions that function as electrolytes.

Accordingly, it is an object of the invention to provide an improved conditioning composition for use in fish aquariums.

Still another object of the invention is to provide an improved composition suitable for both adjusting water pH and treating the build-up of chlorine, chloramines and ammonia.

Yet a further object of the invention is to provide an improved water conditioning formulation for controlling pH and treating harmful chemical build-up without any resulting loss in effectiveness or potency.

Still other objects and advantages of the invention will, in part, be obvious and will, in part, be apparent from the following description.

DETAILED DESCRIPTION

The inventive conditioning composition includes an alkali metal phosphate in an amount between about 10 and 50 weight percent and an alkali metal sulfite in an amount between about 1 and 20 weight percent, with the balance being deionized water. The preferred alkali metal phosphate is monopotassium phosphate which should be present in an amount between about 20.5–31.0 weight percent. Other suitable alkali metal phosphates include monosodium phosphate and disodium phosphate.

An alkali metal phosphate such as monopotassium phosphate is included in the inventive composition in order to control and/or adjust the pH of the aquarium water. This is achieved by the formation of an acid base buffer solution that resists pH change, which otherwise occurs as a result of natural changes in water quality (small amounts of acid or base are normally generated).

An alkali metal sulfite is included in the inventive composition in order to treat the build-up of harmful chemicals such as chlorine, chloramines and ammonia. The preferred alkali metal sulfite is sodium hydrosulfite. In particular, sodium hydrosulfite chemically combines with these chemicals, thereby converting them into less harmful substances. For example, Chlorine from tap water is reduced to harmless chloride ions by the Sodium Hydrosulfite. Other suitable alkali metal sulfites, which could be added to or replace sodium hydrosulfite, include potassium hydrosulfite, calcium hydrosulfite, sodium metabisulfite, sodium sulfite and sodium thiosulfate.

The inventive composition may also include an alkali metal hydroxide in an amount between about 1 and 20 weight percent. The preferred alkali metal hydroxide is sodium hydroxide which should be preferably present in an amount between about 1.5 and 7.5 weight percent. Another suitable alkali metal hydroxide is potassium hydroxide. An alkali metal hydroxide such as sodium hydroxide or potassium hydroxide is incorporated into the inventive composition in order to facilitate the control of water pH. This is achieved by providing hydroxide ions to the buffer solution formed by the monopotassium phosphate.

Other ingredients may be incorporated into the inventive composition including preservatives such as DMDMH Hydantoin in an amount between about 0.1 and 0.6 weight percent and other bases such as sodium carbonate.

For the inventive composition, as stated above, the balance is deionized water, which is present in an amount between about 20 and 90 weight percent. Preferably, deionized water should make up between 56 and 73 weight percent of the inventive composition.

In order to prepare the inventive composition, deionized water is first added to a clean vessel to which sodium hydroxide is then added and dissolved therein. The addition of the sodium hydroxide lowers the pH of the deionized water, thereby enabling monopotassium phosphate, which is then added, to dissolve quickly therewithin. Thereafter, the sodium hydrosulfite ingredient is then added.

The inventive composition is normally available in three different pH levels—pH 6.5, pH 7.0 and pH 7.5. A different pH level composition is used depending upon the requirements of the fish species.

Examples of the inventive formulation are as follows:

|  | pH 6.5 | pH 7.0 | pH 7.5 |
|---|---|---|---|
| Monopotassium phosphate | 20.76% | 23.41% | 30.90% |
| Sodium Hydroxide | 1.52% | 4.56% | 7.50% |
| Sodium Hydrosulfite | 5.0% | 5.0% | 5.0% |
| Deionized Water | 72.72% | 67.03% | 56.6% |

Significantly, it has been found that combining an alkali metal phosphate and sodium hydrosulfite in a single composition does not inhibit chemical effectiveness or potency. In fact, by combining both of these ingredients into a single composition, the ability to control pH balance in the aquarium water is enhanced as these ingredients are not being applied at separate times. In particular, pH balance is enhanced when the ammonia level, both natural and from the chloramines, is controlled, as excess ammonia leads to harmful fluctuations in water chemistry.

As an alternative, the inventive composition may be placed inside a gel capsule for more controlled release of the chemical ingredients. Such a gel capsule is prepared by incorporation of the dry chemical ingredients in a water soluble two-piece or soft gel capsule.

It will thus be seen that the objects set forth above, and those made apparent from the preceding description, are efficiently attained, and since certain changes may be made in the products set forth above without departing from the spirit and scope from the invention, it is intended that all matter contained in the above description and shown in the accompanying drawing shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

The invention claimed is:

1. A composition for conditioning water comprising an alkali metal phosphate in an amount between about 10 and 50 weight percent and sodium hydrosulfite in an amount between about 1 and 20 weight percent.

2. The composition of claim 1, wherein the balance of the composition is water in an amount between about 30 and 89 weight percent.

3. The composition of claim 2, wherein the water is deionized water in an amount between about 56 and 73 weight percent.

4. The composition of claim 1, wherein the alkali metal phosphate is selected from the group consisting of monopotassium phosphate, monosodium phosphate and disodium phosphate.

5. The composition of claim 4, wherein the alkali metal phosphate is monopotassium phosphate in an amount between about 20.5 and 31.0 weight percent.

6. The composition of claim 1, wherein said composition has a pH ranging from between about 6.5 and 7.5.

7. The composition of claim 1, wherein said composition is placed inside a gel capsule.

8. The composition of claim 1, wherein sodium hydrosulfite is present in an amount of about 5 weight percent.

9. A composition for conditioning water comprising an alkali metal phosphate in an amount between about 10 and 50 weight percent, sodium hydrosulfite in an amount between about 1 and 20 weight percent and a preservative in an amount between about 0.1% to 0.6% weight percent.

10. A composition for conditioning water comprising an alkali metal phosphate in an amount between about 10 and 50 weight percent, sodium hydrosulfite in an amount between about 1 and 20 weight percent and sodium carbonate.

11. A composition for conditioning water comprising an alkali metal phosphate in an amount between about 10 and 50 weight percent sodium hydrosulfite in an amount between about 1 and 20 weight percent and an alkali metal hydroxide in an amount between 1 and 20 weight percent.

12. The composition of claim 11, wherein the alkali metal hydroxide is selected from the group consisting of sodium hydroxide and potassium hydroxide.

13. The composition of claim 12, wherein the alkali metal hydroxide is sodium hydroxide in an amount between about 1.5 and 7.5 weight percent.

14. The composition of claim 4, wherein the alkali metal phosphate is monopotassium phosphate and the alkali metal hydroxide is sodium hydroxide.

15. The composition of claim 14, wherein monopotassium phosphate is present in an amount between about 20.5 and 31.0 weight percent, sodium hydroxide is present in an amount between about 1.5 and 7.5 weight percent and deionized water is present in an amount between about 56 and 73 weight percent.

16. A composition for conditioning water comprising an alkali metal phosphate in an amount between about 10 and 50 weight percent and an alkali metal sulfite in an amount between about 1 and 20 weight percent.

17. The composition of claim 16, wherein the alkali metal sulfite is selected from the group consisting of sodium hydrosulfite, potassium hydrosulfite, calcium hydrosulfite, sodium metabisulfite and sodium sulfite.

18. The composition of claim 17, wherein the alkali metal phosphate is selected from the group consisting of monopotassium phosphate, monosodium phosphate and disodium phosphate.

19. The composition of claim 18, further including at least one of sodium hydroxide and potassium hydroxide in an amount between about 1 and 20 weight percent.

20. A composition for conditioning water comprising an alkali metal phosphate in an amount between about 10 and 50 weight percent, an alkali metal sulfite in an amount between about 1 and 20 weight percent and an alkali metal hydroxide in an amount between 1 and 20 weight percent.

21. The composition of claim 20, wherein the phosphate is monopotassium phosphate, the alkali metal sulfite is sodium hydrosulfite and the metal hydroxide is sodium hydroxide.

* * * * *